(12) United States Patent
Cox

(10) Patent No.: US 8,505,585 B2
(45) Date of Patent: Aug. 13, 2013

(54) RUPTURE SEALING DEVICE

(75) Inventor: Glenn E. Cox, Cornwall (CA)

(73) Assignee: Zengo Inc. (CA)

( * ) Notice: Subject to any disclaimer, the term of this patent is extended or adjusted under 35 U.S.C. 154(b) by 0 days.

(21) Appl. No.: 13/286,597

(22) Filed: Nov. 1, 2011

(65) Prior Publication Data

US 2012/0192496 A1 Aug. 2, 2012

(30) Foreign Application Priority Data

Feb. 2, 2011 (CA) ..................................... 2730701

(51) Int. Cl.
*F16L 55/10* (2006.01)
(52) U.S. Cl.
USPC ......................................... 138/89; 137/15.01
(58) Field of Classification Search
USPC ............ 138/89, 97, 99; 114/227; 137/15.01; 29/402.09, 402.14
See application file for complete search history.

(56) References Cited

U.S. PATENT DOCUMENTS

| | | | |
|---|---|---|---|
| 2,098,556 A | | 11/1937 | Tamada |
| 4,252,465 A | * | 2/1981 | Broussard et al. ............ 405/158 |
| 4,379,722 A | * | 4/1983 | Scott ........................ 106/287.17 |
| 4,383,783 A | * | 5/1983 | Kruka et al. .................. 405/171 |
| 5,033,949 A | | 7/1991 | Jewett |
| 5,058,519 A | * | 10/1991 | Collins .......................... 114/227 |
| 5,556,387 A | * | 9/1996 | Mollenauer et al. ........... 604/249 |
| 6,244,897 B1 | * | 6/2001 | Shinozaki ..................... 439/587 |
| 6,502,603 B2 | * | 1/2003 | Lane, Jr. .......................... 138/89 |

FOREIGN PATENT DOCUMENTS

CN 2067250 12/1990

OTHER PUBLICATIONS

PCT, International Search Report, International Application No. PCT/CA2011/000380 (mailed Oct. 19, 2011).

* cited by examiner

*Primary Examiner* — Patrick F Brinson
(74) *Attorney, Agent, or Firm* — Thompson Hine L.L.P.

(57) ABSTRACT

A rupture sealing device including an anchor mechanism for being disposed through the rupture of a container and for interacting with an inside wall of the container in proximity to the rupture. The rupture sealing device further includes a substantially deformable sealing body for interacting in a sealing fashion with an outside wall of the container in proximity to the rupture. The sealing body has a pressure contact surface and extends a substantial distance therefrom. A pressure structure is in contact with the pressure contact surface of the sealing body for providing pressure acting on the sealing body. A fastening mechanism is connected to the anchor mechanism. The fastening mechanism includes a fastening structure for interacting with a respective fastening element connected to the pressure structure to provide the pressure acting on the sealing body.

12 Claims, 10 Drawing Sheets

RUPTURE SEALING DEVICE

This application claims priority to Canadian Patent Application No. 2,730,701 entitled RUPTURE SEALING DEVICE filed on Feb. 2, 2011, the entire contents of which are incorporated herein by reference.

FIELD

The present invention relates to the field of sealing devices, and more particularly to a rupture sealing device for quickly sealing a rupture in a fluid, granular or powder container or pipeline in an emergency situation.

BACKGROUND

Liquid containers such as, for example, fuel tanks of vehicles, frequently experience ruptures in accidents. The longer a hazardous substance is allowed to spill, the greater is the danger to emergency workers and the environment, as well as the more costly is the cleanup.

Currently, one type of rupture seal used in emergency situations comprises a granular substance that is mixed on site with water to form a putty before being pushed into the rupture. A backing—typically a board or a shovel—is then used for holding the putty in the rupture. Another type of rupture seal comprises a rubber bung having a threaded rod inserted in an aperture thereof. A wing nut and washer is attached to the threaded rod on the outside of the bung and a butterfly wall anchor is attached to the inside end of the threaded rod. The rod and the butterfly anchor are inserted into the container through the rupture and the wing nut is tightened forcing the bung into contact with the outside wall of the container around the rupture. Unfortunately, both rupture seals are difficult and time-consuming to deploy.

U.S. Pat. No. 5,058,519 discloses a large, spring loaded, butterfly type anchoring systems connected to a flexible strap which is inserted through a sealing plate and secured thereto. The anchor is passed through the rupture and the sealing plate is positioned against the wall. Then the strap is pulled until the plate is held tight against the wall to form a seal. Unfortunately, the sealing plate does not form a proper seal in various situations such as, for example, when material is protruding from the edge of the rupture.

It is desirable to provide a rupture sealing device that is simple.

It is also desirable to provide a rupture sealing device that is rapidly deployed.

It is also desirable to provide a rupture sealing device that is capable of sealing a rupture in situations where material is protruding from the edge of the rupture.

SUMMARY

Accordingly, one object of the present invention is to provide a rupture sealing device that is simple, safe and cost effective.

Another object of the present invention is to provide a rupture sealing device that is rapidly deployed.

Another object of the present invention is to provide a rupture sealing device that is capable of sealing a rupture in situations where material is protruding from the edge of the rupture.

According to one aspect of the present invention, there is provided a rupture sealing device. The rupture sealing device comprises an anchor mechanism for being disposed through the rupture of a container and for interacting with an inside wall of the container in proximity to the rupture. The rupture sealing device further comprises a substantially deformable sealing body for interacting in a sealing fashion with an outside wall of the container in proximity to the rupture. The sealing body has a pressure contact surface and extends a substantial distance therefrom. A pressure structure is in contact with the pressure contact surface of the sealing body for providing pressure acting on the sealing body. A fastening mechanism is connected to the anchor mechanism. The fastening mechanism comprises a fastening structure for interacting with a respective fastening element connected to the pressure structure to provide the pressure acting on the sealing body.

According to another aspect of the present invention, there is further provided a rupture sealing device. The rupture sealing device comprises an anchor mechanism for being disposed through the rupture of a container and for interacting with an inside wall of the container in proximity to the rupture. The rupture sealing device further comprises a substantially deformable sealing body for interacting in a sealing fashion with an outside wall of the container in proximity to the rupture. The sealing body has a pressure contact surface and extends a substantial distance therefrom. A pressure structure is in contact with the pressure contact surface of the sealing body for providing pressure acting on the sealing body. The pressure structure comprises a pressure plate having a wall structure extending therefrom towards the anchor mechanism. The wall structure accommodates a portion of the sealing body therein. A fastening mechanism is connected to the anchor mechanism. The fastening mechanism comprises a fastening structure for interacting with a respective fastening element connected to the pressure structure to provide the pressure acting on the sealing body.

According to another aspect of the present invention, there is further provided a rupture sealing device. The rupture sealing device comprises an anchor mechanism for being disposed through the rupture of a container and for interacting with an inside wall of the container in proximity to the rupture. The rupture sealing device further comprises a substantially deformable sealing body for interacting in a sealing fashion with an outside wall of the container in proximity to the rupture. The sealing body has a pressure contact surface and extends a substantial distance therefrom. In one embodiment of the present invention, the sealing body is made of a silicone gel substance, resistant to being dissolved by water, or other liquids, hydrocarbons or chemicals. A pressure structure is in contact with the pressure contact surface of the sealing body for providing pressure acting on the sealing body. A fastening mechanism is connected to the anchor mechanism. The fastening mechanism comprises a fastening structure for interacting with a respective fastening element connected to the pressure structure to provide the pressure acting on the sealing body.

One advantage of the present invention is that it provides a rupture sealing device that is simple.

A further advantage of the present invention is that it provides a rupture sealing device that is rapidly deployed.

A further advantage of the present invention is that it provides a rupture sealing device that is capable of sealing a rupture in situations where material is protruding from the edge of the rupture.

BRIEF DESCRIPTION OF THE DRAWINGS

Certain embodiments of the present invention is described below with reference to the accompanying drawings, in which.

DETAILED DESCRIPTION

Figure 1A:
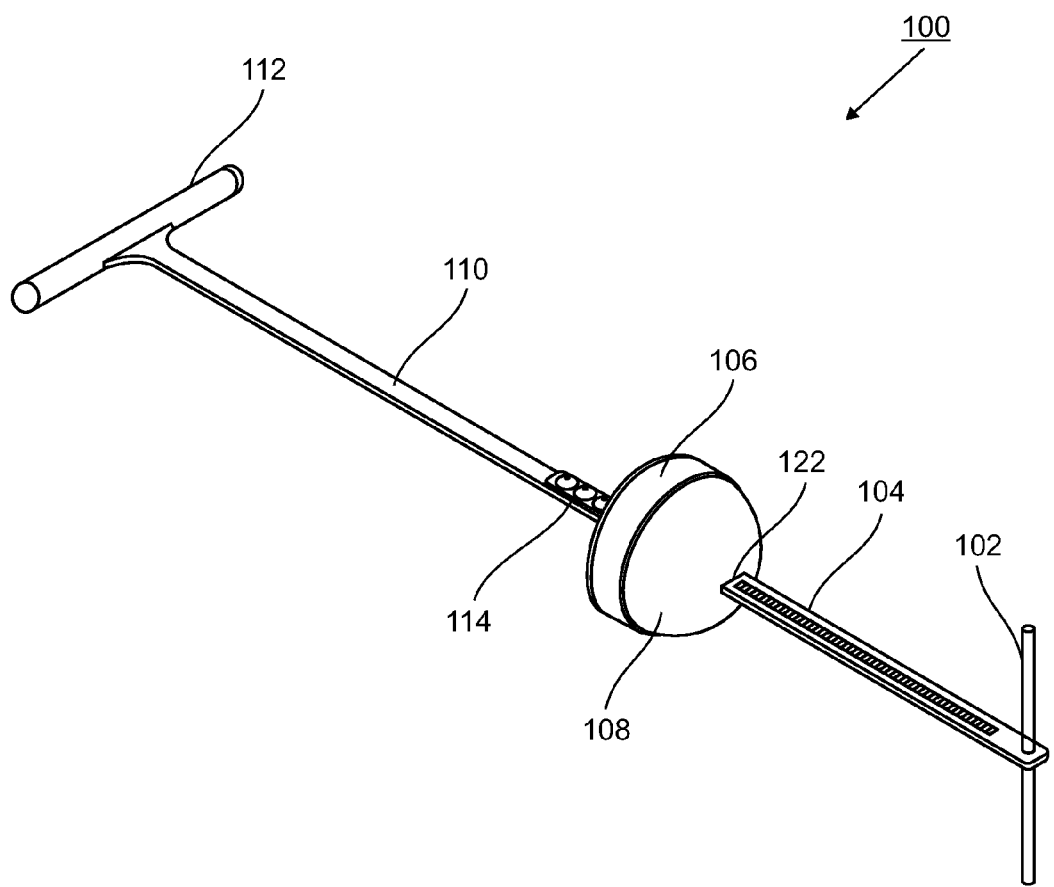
FIGS. 1a and 1b are simplified block diagrams illustrating a perspective front view and a perspective rear view of a rupture sealing device according to one embodiment of the invention.
Figure 1B:
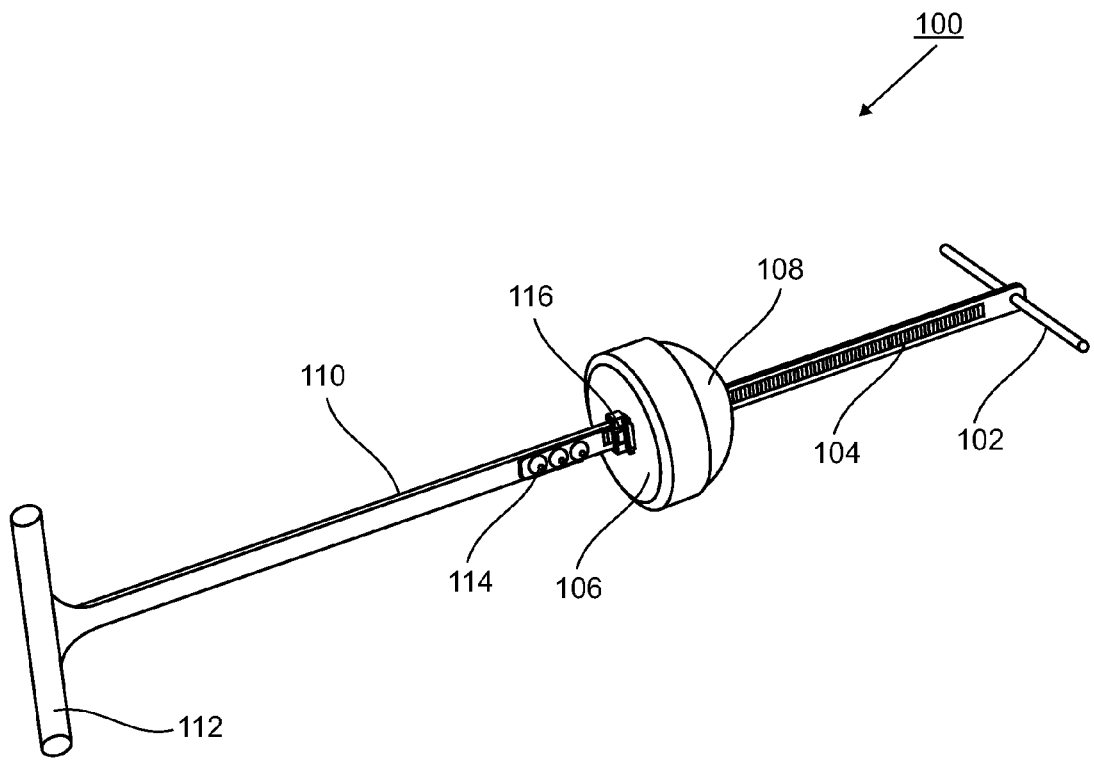

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

Referring to FIGS. 1a to 1k, a rupture sealing device 100 according to one embodiment of the invention is provided. The rupture sealing device 100 comprises an anchor mechanism 102 for being disposed through the rupture of a container and for interacting with an inside wall of the container in proximity to the rupture. The anchor mechanism 102 is connected to fastening mechanism 104. The fastening mechanism 104 is accommodated in apertures 122 and 126 of sealing body 108 and pressure structure 106, respectively. Gripping structure 110 is connected to the fastening mechanism 104.

Figure 1C:
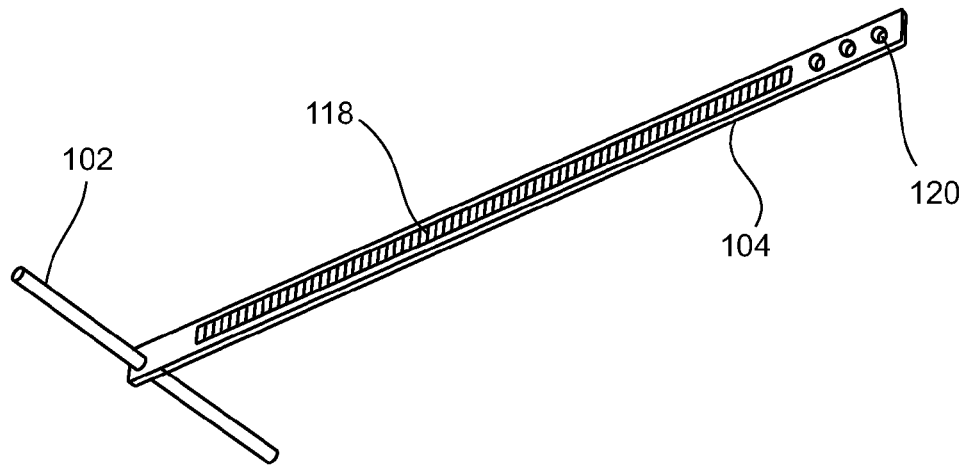
FIG. 1c is a simplified block diagram illustrating a perspective view of a fastening mechanism of the rupture sealing device illustrated in FIGS. 1a and 1b.

The anchor 102 may comprise an elongated rigid bar—for example, made of a suitable metal and covered with a suitable plastic material such as nylon—which is connected to the fastening mechanism 104 comprising a strap made of a suitable flexible material such as, for example, a nylon type plastic material, as illustrated in FIG. 1c. The connection of the anchor 102 illustrated in FIG. 1c is manufactured, for example, by incorporating the metal bar in a standard plastic molding process for manufacturing the fastening mechanism 104 with the anchor 102 being integrated therewith. The anchor 102 as illustrated in FIG. 1c is easily inserted into even small ruptures by folding the same against the flexible strap of the fastening mechanism 104 as will be described herein below.

Figure 1D:
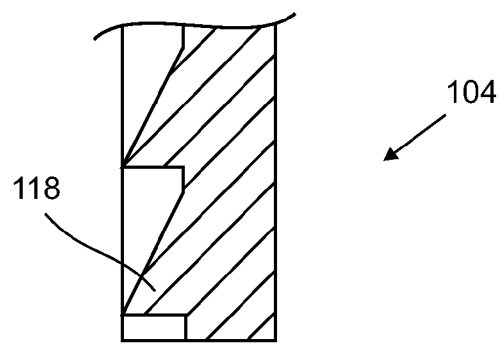
FIG. 1d is a simplified block diagram illustrating a cross-sectional view of a portion of the fastening mechanism illustrated in FIG. 1c.
Figure 1E:
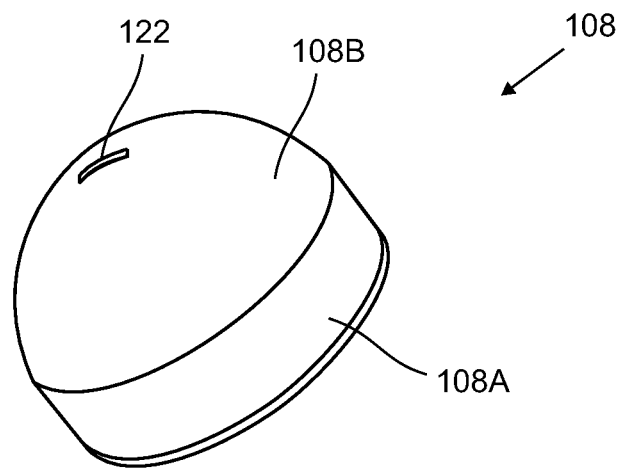
FIGS. 1e and 1f are simplified block diagrams illustrating a perspective view and a side view of a sealing body of the rupture sealing device illustrated in FIGS. 1a and 1b.
Figure 1F:
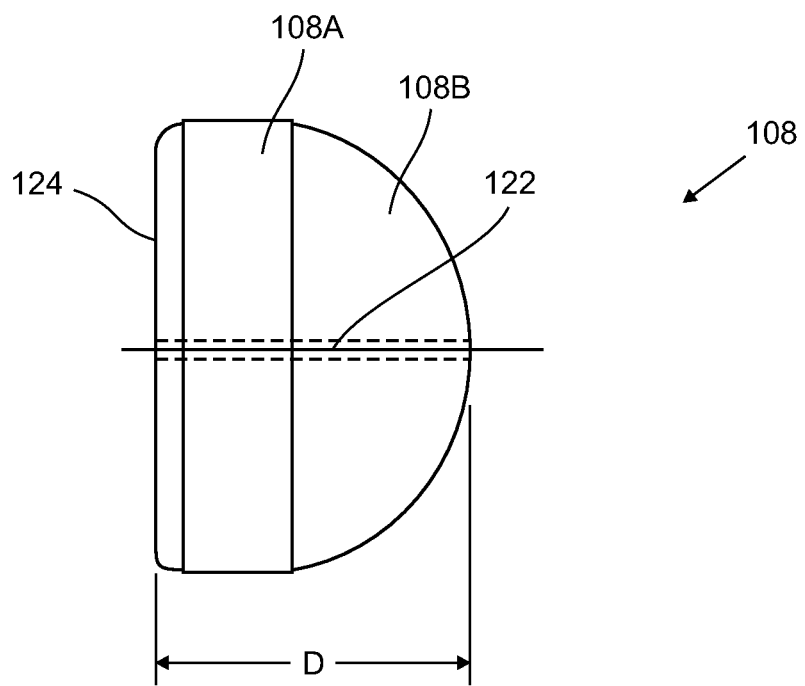
Figure 1G:
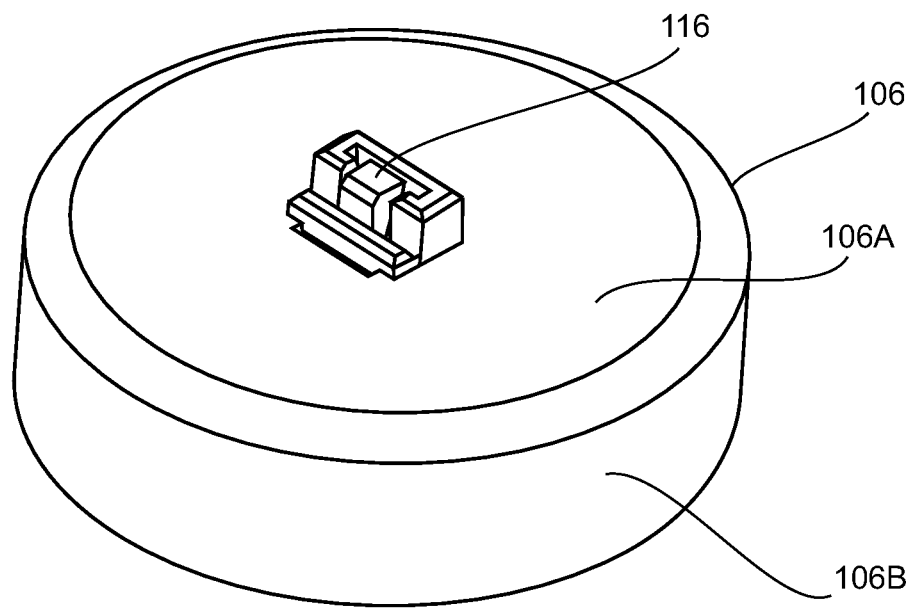
FIGS. 1g and 1h are simplified block diagrams illustrating a perspective view and a cross-sectional view of a pressure structure of the rupture sealing device illustrated in FIGS. 1a and 1b.
Figure 1H:
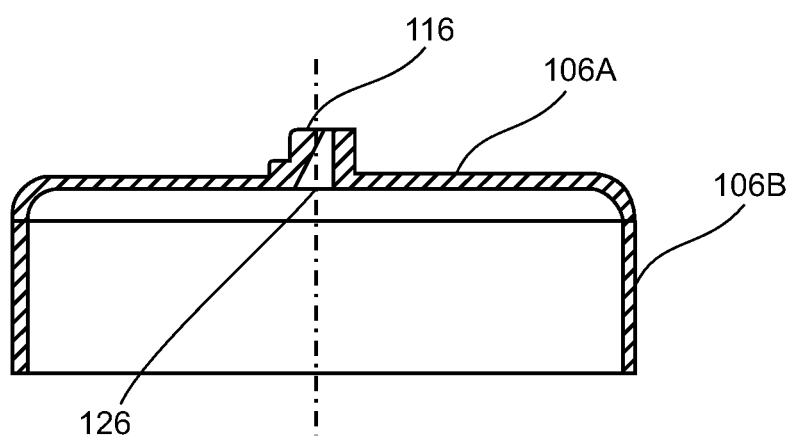
Figure 1I:
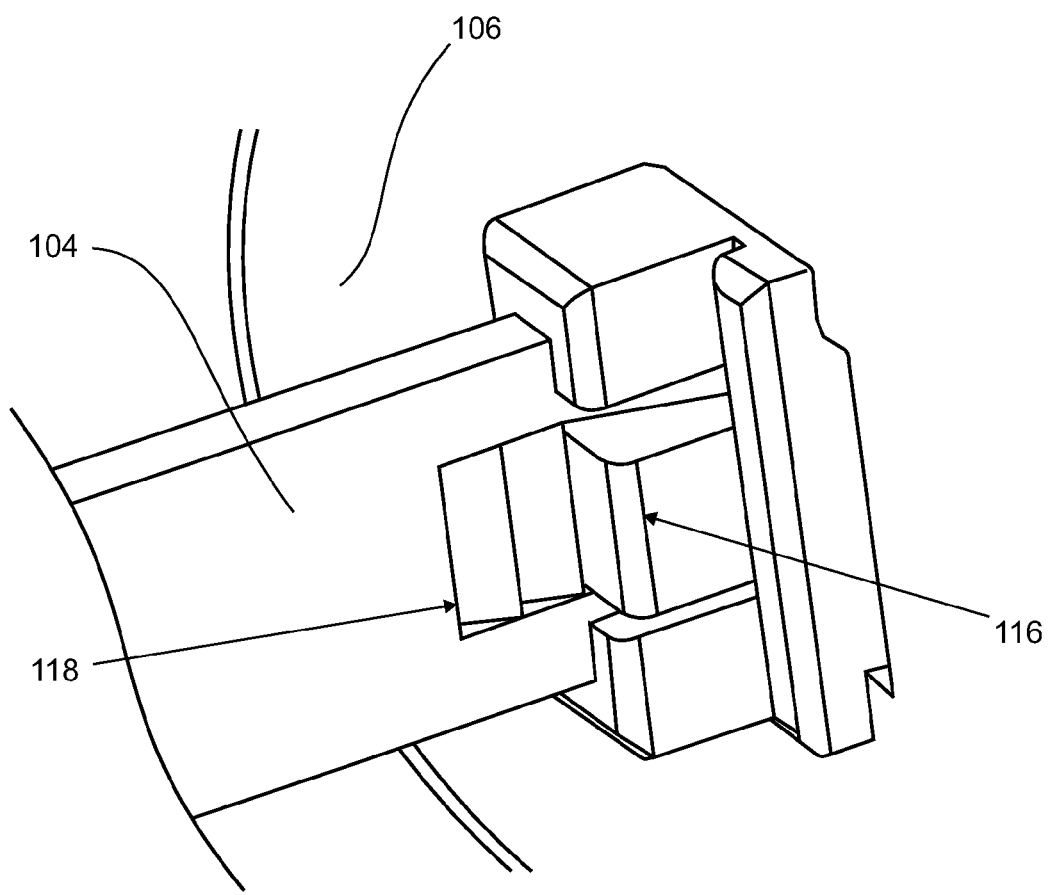
FIG. 1i is a simplified block diagram illustrating a perspective view of a fastening element of the pressure structure illustrated in FIGS. 1g and 1h.

The fastening mechanism 104 may comprise a ratchet type fastening structure 118 disposed along a predetermined length of the fastening mechanism 104, as illustrated in FIGS. 1c and 1d. The fastening structure 118 interacts with a respective fastening element 116 connected to the pressure structure 106, as illustrated in FIGS. 1g and 1h. For example, the fastening structure 118 comprises a zip-tie interacting with a respective zip-tie lock. The fastening mechanism 104 enables movement of the pressure structure 106 along the fastening mechanism 104 towards the anchor 102 but blocks reverse movement. Alternatively, other types of fastening mechanisms are employed such as, for example, by disposing a plurality of cone like structures along a string or a plurality of grooves along a flexible rod.

Further alternatively, the anchor 102 is pivotally movable mounted to the fastening mechanism 104, enabling provision of the fastening mechanism 104 as a rigid structure.

The pressure structure 106 may comprise a pressure plate 106A having a wall structure 106B extending therefrom towards the anchor mechanism 102 and forming a cup-like structure, as illustrated in FIGS. 1g and 1h. The wall structure 106B is designed for accommodating a portion of the sealing body 108 therein. The pressure plate 106A comprises the aperture 126 for accommodating the fastening mechanism 104 therein and the fastening element 116 for interacting with the fastening structure 118. The pressure structure 106 together with the fastening element 116 is made of, for example, a suitable plastic material such as a nylon type material and is manufactured, for example, as a single unit using a standard plastic molding process. Provision of the wall structure 106B assists in compressing the sealing material around the fastening mechanism 104 and towards the rupture. Alternatively, the fastening element 116 is attached to the pressure structure using, for example, an adhesive. Further alternatively, the pressure plate 106A is convex or concave shaped. The extension of the wall structure 106B is determined, for example, in dependence of a type of rupture that is to be sealed. For example, if ruptures having material protruding therefrom are expected, a longer extension of the wall structure 106B is provided to accommodate the protrusion therein. Alternatively, the wall structure 106B is omitted.

The pressure plate 106A is in contact with a respective contact surface 124 of the sealing body 108 for providing pressure acting on the sealing body 108 when being pushed towards the anchor 102. The sealing body 108 is substantially deformable for interacting in a sealing fashion with an outside wall of the container in proximity to the rupture. As illustrated in FIGS. 1e and 1f, the sealing body 108 comprises a contact surface 124 for interacting with the pressure plate 106A and extends a substantial distance D therefrom. The sealing body 108 comprises a portion 108A for being accommodated within the wall structure 106B and a portion 108B protruding therefrom. The portion 108B has, for example, the shape of a half sphere or cone. The sealing body 108 further comprises the aperture 122 for movable accommodating a portion of the fastening mechanism 104 therein. The sealing body 108 can be made of a single easily deformable, impermeable, and substantially chemical resistant material such as, for example, low durometer silicone using, for example, a standard molding process. The shape and the distance D are determined, for example, in dependence of a type of rupture that is to be sealed. For example, if ruptures having material protruding therefrom are expected, a longer distance D of the wall sealing body 108 is provided to accommodate the protrusion therein. Alternatively, the sealing body 108 comprises a skin type wall structure filled with a suitable foam, gel, or fluid.

Figure 1J:
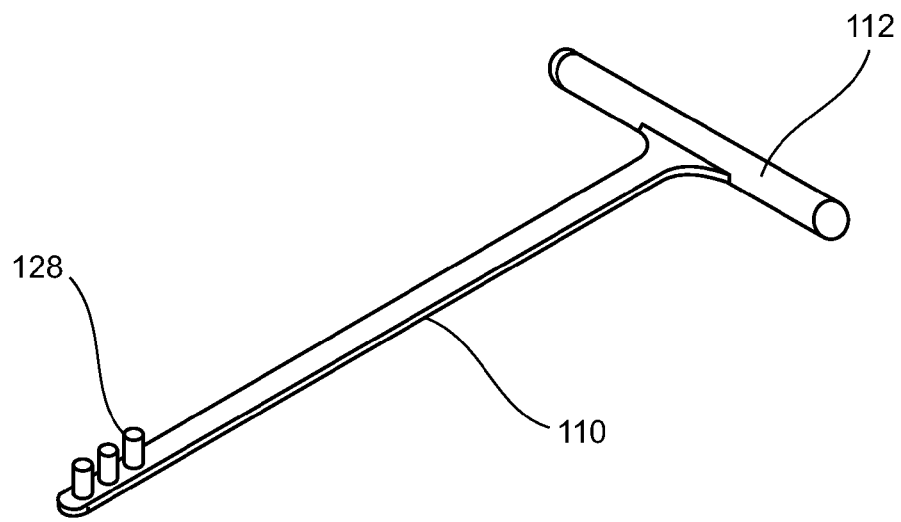
FIG. 1j is a simplified block diagram illustrating a perspective view of a gripping structure of the rupture sealing device illustrated in FIGS. 1a and 1b.
Figure 1K:
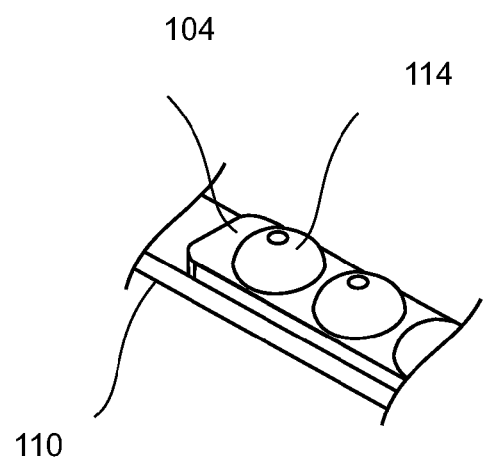
FIG. 1k is a simplified block diagram illustrating a perspective view of a portion of the gripping structure illustrated in FIG. 1j mounted to the fastening mechanism; and, FIGS. 2a to 2e are simplified block diagrams illustrating perspective views of the deployment of the rupture sealing device illustrated in FIGS. 1a and 1b.

The rupture sealing device can comprise the gripping structure 110 for facilitating pulling of the fastening mechanism 104 after insertion of the anchor 102. The gripping structure comprises, for example, a handle bar 112, as illustrated in FIG. 1*j*, or a ring like structure. The gripping structure 110 is mounted to the fastening mechanism 104 via protrusions 128 which are accommodated in respective apertures 120 of the fastening mechanism 104. The gripping structure 110, together with the handle bar 112 and the protrusions 128, can be made of a suitable thermoplastic as a single unit using a standard plastic molding process. Use of a thermoplastic facilitates assembly by using a thermal plastic process after insertion of the protrusions 128 in the respective apertures 120 to form melted thermoplastic rivets, as illustrated in FIG. 1*k*, for mounting the gripping structure 110 to the fastening mechanism 104. Optionally, the gripping structure 110 is omitted requiring a user to grip the end portion of the fastening mechanism 104 for pulling.

The rupture sealing device 100 is assembled in a simple fashion by: inserting the fastening mechanism 104 through the aperture 122 of the sealing body 108 and the aperture 126 of the pressure structure 106; inserting the sealing body 108 into the pressure structure 106; and attaching the gripping structure 110 as described herein above.

The rupture sealing device 100 is adaptable for sealing ruptures of various shapes and sizes. For example, in one embodiment of the present invention, the rupture sealing device 100 illustrated in FIGS. 1*a* to 1*k* has the following dimensions: diameter of the pressure structure 106 is approximately 52 mm; height of the wall structure 106B is approximately 13 mm; distance D of the sealing body 108 is approximately 40 mm; length of the fastening mechanism 104 is approximately 200 mm; and length of the elongated anchor bar 102 is approximately 90 mm, and is capable of sealing ruptures up to approximately 25 mm in diameter, it being understood that a wide range of variously shaped and sized devices of the present invention are included within the scope of the present invention. To accommodate elongated ruptures the pressure structure 106 and the sealing body 108 are provided having an elongated cross-section such as, for example, an oval shaped cross section, instead of the circular cross-section. Optionally, the rupture sealing device 100 is provided with two or more fastening mechanisms 104 and anchors 102.

The rupture sealing device 100 is employable to seal ruptures in containers containing various types of fluids, powders, or granular substances as well as to seal ruptures in pipes or boat hulls. The rupture sealing device 100 can be made of plastic material or metal components are covered with a plastic material to prevent generation of sparks when deployed to stop leakage of flammable materials. In the case of, for example, a sealing a rupture in a pipe, it is understood that the sealing body described herein is suitably adapted for sealing engagement with the surface of the ruptured pipe.

Figure 2A:
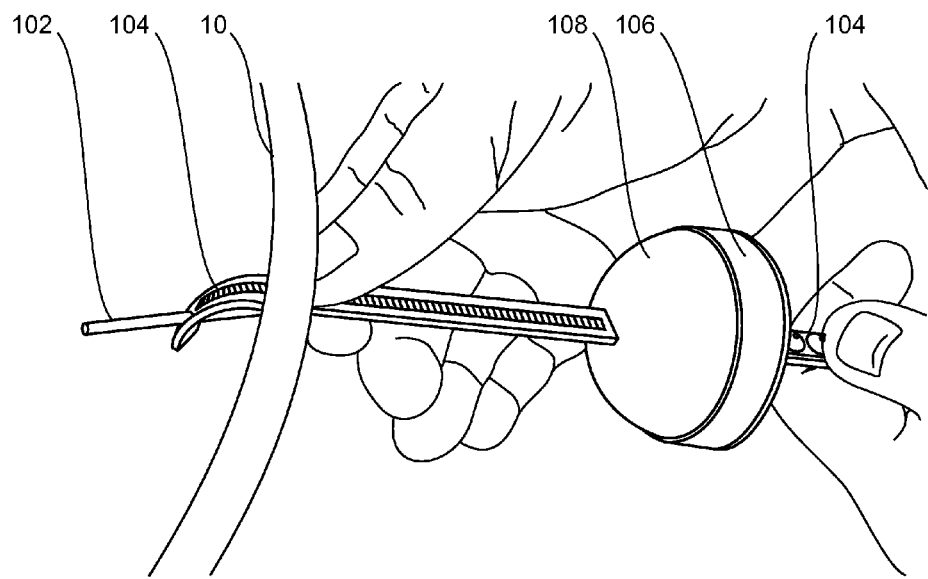
Figure 2B:
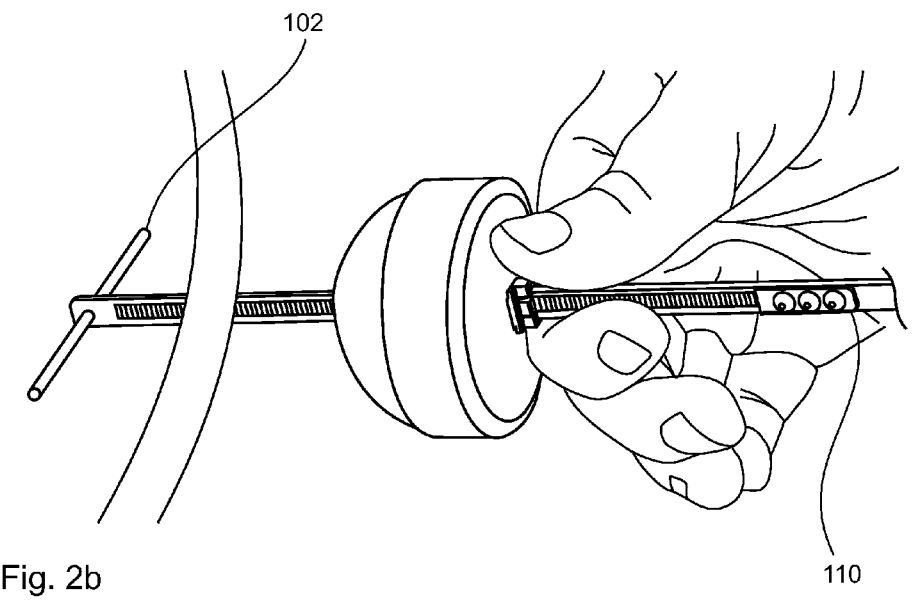
Figure 2C:
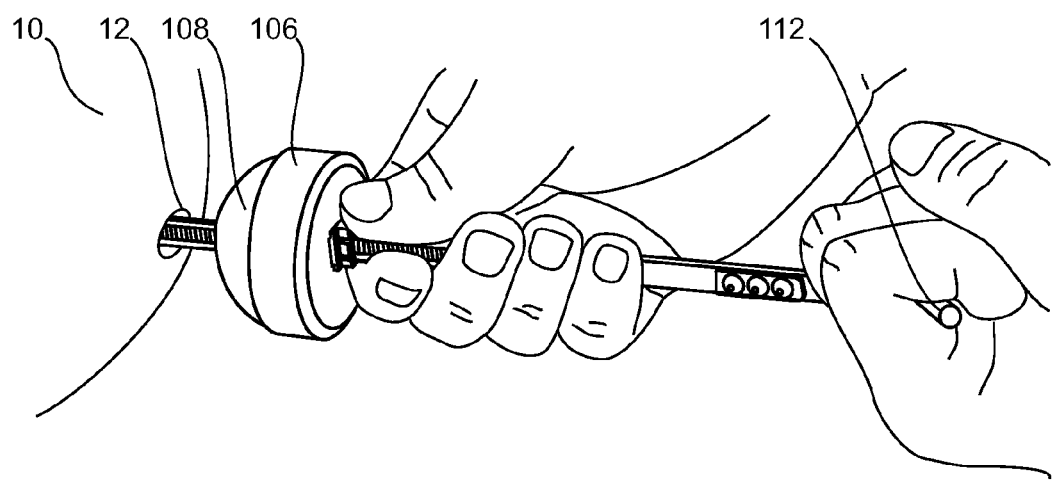
Figure 2D:
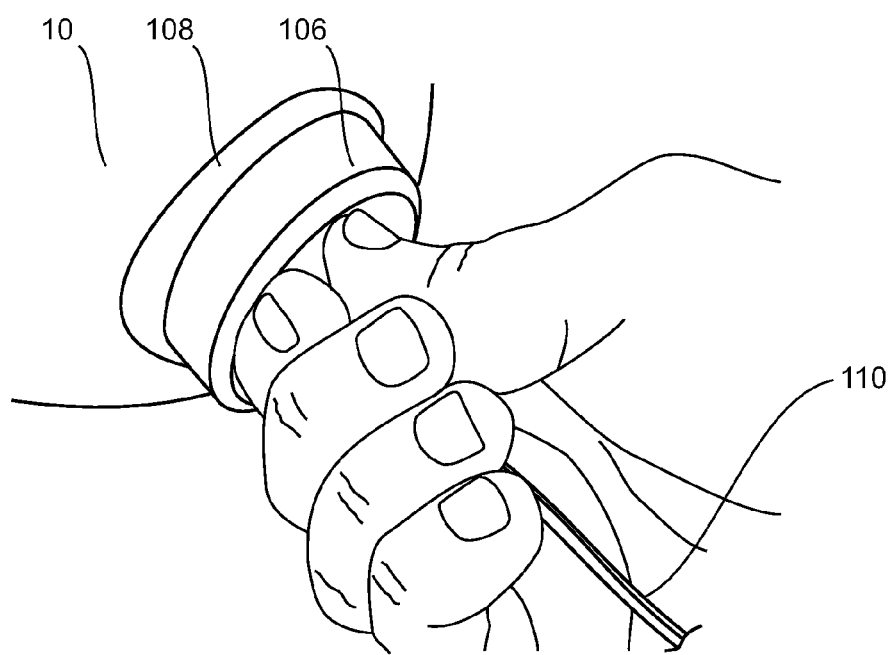
Figure 2E:
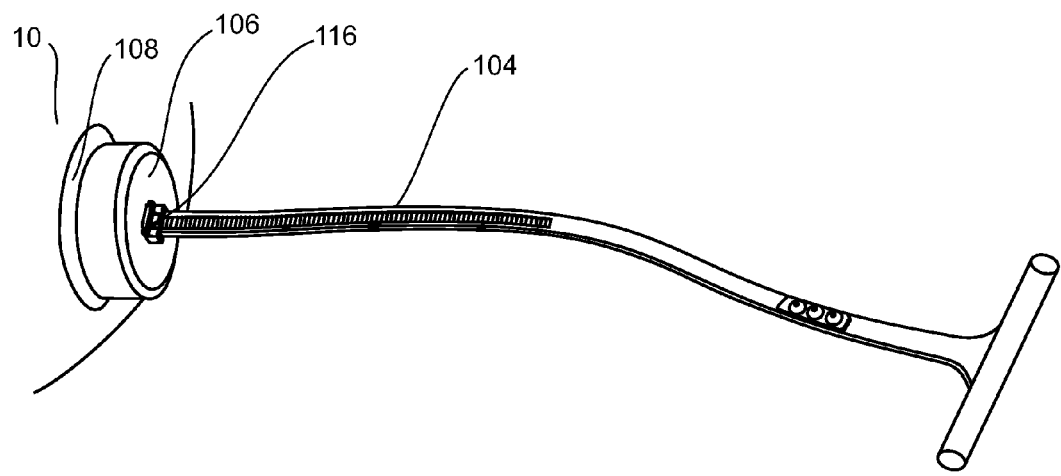

Referring to FIGS. 2*a* to 2*e*, deployment of the rupture sealing device 100 according to an embodiment of the invention is shown. First the anchor 102 is bent back and then inserted together with the fastening mechanism 104 into the rupture 12 of the container 10, as illustrated in FIG. 2*a*. As shown in FIG. 2*b*, the user then releases the anchor 102 and fully inserts the same into the container 10. The user then grasps the handle 112 with one hand and pulls the same to bring the anchor 102 in contact with the inside wall of the container 10. While pulling the handle 112 with the one hand, the user pushes the pressure structure 106 and the sealing body 108 with the other hand towards the container 10, as illustrated in FIG. 2*c*. In FIG. 2*d* the user pushes the pressure structure 106 and the sealing body 108 such that the sealing body 108 is getting deformed to form a seal around the rupture 12 while still pulling the handle 112. Referring to FIG. 2*e*, the sealing body 108 has been pressed firmly against the rupture, sealing the leak. The fastening element 116 interacting with the fastening structure of the fastening mechanism 104 maintain the pressure on the sealing body 108. Deployment of the rupture sealing device 100 according to the illustrated process is typically performed in 5 seconds or less.

The present invention has been described herein with regard to certain embodiments. However, it will be obvious to persons skilled in the art that a number of variations and modifications can be made without departing from the scope of the invention as described herein.

What is claimed is:

1. A rupture sealing device comprising:
   an anchor mechanism for being disposed through the rupture of a container and for interacting with an inside wall of the container in proximity to the rupture;
   a substantially deformable sealing body for interacting in a sealing fashion with an outside wall of the container in proximity to the rupture, the sealing body having a pressure contact surface and extending a substantial distance therefrom;
   a pressure structure in contact with the pressure contact surface of the sealing body for providing pressure acting on the sealing body; and,
   a fastening mechanism connected to the anchor mechanism, the fastening mechanism comprising a fastening structure for interacting with a respective fastening element connected to the pressure structure to provide the pressure acting on the sealing body.

2. A rupture sealing device as defined in claim 1 wherein the pressure structure comprises a pressure plate having a wall structure extending therefrom towards the anchor mechanism, the wall structure accommodating a portion of the sealing body therein.

3. A rupture sealing device as defined in claim 1 wherein the sealing body and the pressure structure each comprise an opening accommodating a portion of the fastening mechanism therein.

4. A rupture sealing device as defined in claim 1 wherein the anchor mechanism comprises an elongated rigid bar.

5. A rupture sealing device as defined in claim 1 wherein the fastening mechanism comprises a ratchet type strap made of a flexible material.

6. A rupture sealing device as defined in claim 5 wherein the fastening mechanism comprises zip-tie and the fastening element comprises a zip-tie lock.

7. A rupture sealing device as defined in claim 1 wherein the sealing body is made of a gel substance.

8. A rupture sealing device as defined in claim 7 wherein the sealing body is made of a silicone gel.

9. A rupture sealing device as defined in claim 1 comprising a handle connected to the fastening mechanism.

10. A rupture sealing device as defined in claim 1 wherein the sealing body is adapted for sealing engagement with the surface of a ruptured pipe.

11. A rupture sealing device as defined in claim 1 wherein the sealing body is made of an easily deformable material such that the shape of the sealing body is substantially deformable for interacting in a sealing fashion with the outside wall of the container when pressure is applied to the pressure contact surface.

12. A rupture sealing device as defined in claim 1 wherein the distance the sealing body is extending from the pressure contact surface is determined such that the sealing body is capable of accommodating therein a protrusion extending from the outside wall of the container.

* * * * *